United States Patent
Singh et al.

(10) Patent No.: US 11,164,184 B2
(45) Date of Patent: *Nov. 2, 2021

(54) METHOD AND SYSTEM BARCODE-ENABLED PAYMENTS

(71) Applicant: MASTERCARD INTERNATIONAL INCORPORATED, Purchase, NY (US)

(72) Inventors: Harjender Singh, Singapore (SG); Patrik Smets, Nijlen (BE); Philip Wei Ping Yen, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,110

(22) Filed: May 20, 2020

(65) Prior Publication Data

US 2020/0279251 A1   Sep. 3, 2020

Related U.S. Application Data

(63) Continuation of application No. 15/878,571, filed on Jan. 24, 2018, now Pat. No. 10,692,079.

(51) Int. Cl.
*G06Q 20/32* (2012.01)
*G06Q 20/02* (2012.01)
(Continued)

(52) U.S. Cl.
CPC ......... *G06Q 20/385* (2013.01); *G06Q 20/027* (2013.01); *G06Q 20/3274* (2013.01);
(Continued)

(58) Field of Classification Search
CPC ............ G06Q 20/385; G06Q 20/3676; G06Q 20/027; G06Q 20/3672; G06Q 20/367;
(Continued)

(56) References Cited

U.S. PATENT DOCUMENTS

2015/0032625 A1* 1/2015 Dill et al. .......... G06Q 20/4016
2015/0161597 A1* 6/2015 Subramanian et al. .....................
G06Q 20/3674
(Continued)

FOREIGN PATENT DOCUMENTS

CN           107004192 A      8/2017
TW           201721543 A      6/2017
WO  PCT/US2018/063188    *  2/2019  ............ G06Q 20/02

OTHER PUBLICATIONS

Office Action dated Dec. 20, 2019 by the Taiwanese Patent Office in Taiwan Patent Application No. 107146557, 6 pages.
(Continued)

*Primary Examiner* — Mohammad Z Shaikh
*Assistant Examiner* — George N. Proios
(74) *Attorney, Agent, or Firm* — Buchanan Ingersoll & Rooney PC (57) ABSTRACT

A method for facilitating a transaction with a one-time number includes: receiving a first transaction request, wherein the first transaction request includes a plurality of data elements including at least a first data element configured to store a zero transaction amount and a second data element configured to store a primary account number; parsing the primary account number stored in the second data element included in the received first transaction request; generating a one-time value, wherein the one-time value includes a predetermined number of digits and a subset of the predetermined number of digits is a reference to the processing server; storing a data entry comprised of at least the parsed primary account number and the generated one-time value; and transmitting the generated one-time value in response to the received first transaction request.

10 Claims, 6 Drawing Sheets

(51) Int. Cl.
*G06Q 20/36* (2012.01)
*G06Q 20/38* (2012.01)
(52) U.S. Cl.
CPC ....... *G06Q 20/367* (2013.01); *G06Q 20/3672* (2013.01); *G06Q 20/3676* (2013.01)
(58) Field of Classification Search
CPC ............. G06Q 20/3274; G06Q 20/065; G06Q 20/382; G06Q 20/20
USPC ....................................................... 705/4, 39
See application file for complete search history.

(56) References Cited

U.S. PATENT DOCUMENTS

| | | | |
|---|---|---|---|
| 2016/0148197 A1* | 5/2016 | Dimmick ........... | G06Q 20/3674 |
| 2017/0337549 A1* | 11/2017 | Wong | |
| 2018/0144339 A1* | 5/2018 | Beidas ............... | G06Q 20/3821 |
| 2019/0122206 A1* | 4/2019 | Yen et al. ............ | G06Q 20/385 |
| 2019/0147439 A1* | 5/2019 | Wang et al. ....... | G06Q 20/3821 |

OTHER PUBLICATIONS

Notification of Transmittal of the International Search Report and the Written Opinion dated Feb. 27, 2019 for Application No. PCT/US2018/063188, 10 Pages.

* cited by examiner

METHOD AND SYSTEM BARCODE-ENABLED PAYMENTS

FIELD

The present disclosure relates to transactions utilizing a one-time number, specifically the use of mapping to enable one-time numbers to be used to conduct payment transactions through barcodes or other similar means that are funded by transaction accounts that are identified via the mapping.

BACKGROUND

With the increasing prevalence of computing devices, many methods have been developed to enable a computing device to be used to fund an electronic payment transaction. Originally, a user could manually input payment details into their computing device, which would be transmitted for processing in the payment transaction, such as via a web page or other similar application program. As technology became more advanced, electronic wallets were developed, which were specialized application programs that utilized more secure methods of storage to store payment credentials, which could be electronically transmitted to a merchant point of sale through a network (e.g., the Internet) or even directly, such as via near field communication for an in-purchase transaction. Traditionally, electronic wallets have operated by storing all of the same data that would be stored in a payment card and conveying it to a point of sale, where the point of sale receives the same data that it would if reading the payment card directly, effectively trading a payment card for a mobile device that acts as a payment card.

In more recent times, some entities have developed their own kinds of electronic wallets, such as Alipay® that use alternative methods to pay for payment transactions. In such wallets, the wallet may generate unique data that is provided to the merchant, where the merchant routes that data back to the provider of the wallet or an associated financial institution that can identify a related, pre-funded, cash balance account to be used to fund the transaction. Such methods provide for greater security than standard electronic wallets, as the unique data may be usable for only a single transaction, and may only be processed through merchants that are configured to receive and use such data, where the provider of the wallet acts as a payment service provider for the transaction. One common type of unique data is a one-time number.

However, current systems that utilize one-time numbers require the use of transaction accounts that are issued or otherwise managed by the processors of the one-time number. Such a processor would have to have the account information stored in its system in order to pass the transaction onto another payment processor, which would be a security risk and require additional input communications and interactions with the consumer, the one-time number processor, and one or more payment processors. As a result, this limits the abilities for consumers to freely select how to fund such transaction, and may, in turn, limit the usage of one-time numbers, which may disadvantage the associated entities as well as merchants that may lack the ability to process payment transactions that utilize traditional payment credentials. Thus, there is a need for a technological solution to enable a one-time number to be used for a transaction that is funded via an external transaction account without the problems associated with setting up an one-time payment number processor to have multiple payment processor funding sources as identified about and otherwise known.

SUMMARY

The present disclosure provides a description of systems and methods for facilitating transactions with a one-time number using traditional payment rails to facilitate the request for generation of a one-time payment number that would be funded by a consumer selected funding source that is a payment card account from an issuer that can transact on those rails. The issuer can then generate the one-time use number (or a reference number identifying same) that is sent to the wallet provider to be transmitted to the consumer. The wallet provider enables the consumer to generate and display a bar code to the merchant at a point of sale (POS), and the transaction authorization is sent to the wallet provider. The wallet provider system recognizes the one-time use number and forwards it (or the reference number) for authorization and the result of that authorization is then sent to the wallet provider system, which in turn forwards its decision to the merchant. This way, a traditional transaction account can be used to fund a transaction that does not occur on payment rails, but is instead a transaction using a one-time number with an associated wallet provider, and without requiring multiple transmissions form the consumer, the wallet provider or the merchant, all while keeping the actual payment card account details out of the merchant and wallet systems for greater security.

A user may select a transaction account that they would like to use in a future transaction where a one-time number would need to be used. A transaction having a zero or nominal amount may be processed using the selected transaction account, which enables a back-end system to generate a one-time number that is then mapped to that transaction account. The one-time number is provided back to the user, who may then use the one-time number (e.g., encoded in a machine-readable code displayed by their computing device) for a future payment transaction involving a merchant or wallet provider configured to process transactions with one-time numbers. During the processing of the transaction with the one-time number, the transaction may be routed to the back-end system, which may identify the transaction account mapped to the one-time number and then process the transaction using that transaction account. As a result, a payment transaction may be conducted using a one-time number, but funded via a standard transaction account, utilizing the mapping and routing facilitated by the back-end system. Thus, merchants and wallet providers that are only configured to utilize one-time numbers may still process payment transactions funded by external transaction accounts, providing for more opportunities with consumers, while also enabling consumers to have free choice of the transaction account used to fund transactions at such merchants.

A method for facilitating a transaction with a one-time number includes: receiving, by a receiver of a processing server, a first transaction request, wherein the first transaction request includes a plurality of data elements including at least a first data element configured to store a zero transaction amount and a second data element configured to store a primary account number; parsing, by the processing server, the primary account number stored in the second data element included in the received first transaction request; generating, by the processing server, a one-time value, wherein the one-time value includes a predetermined number of digits and a subset of the predetermined number of digits is a reference to the processing server; storing, in a memory of the processing server, a data entry comprised of at least the parsed primary account number and the generated one-time value; and electronically transmitting, by a transmitter of the processing server, the generated one-time value in response to the received first transaction request.

A system for facilitating a transaction with a one-time number includes: a receiver configured to receive a first transaction request, wherein the first transaction request includes a plurality of data elements including at least a first data element configured to store a zero transaction amount and a second data element configured to store a primary account number; a processing server configured to parse the primary account number stored in the second data element included in the received first transaction request, and generate a one-time value, wherein the one-time value includes a predetermined number of digits and a subset of the predetermined number of digits is a reference to the processing server; a memory of the processing server configured to store a data entry comprised of at least the parsed primary account number and the generated one-time value; and a transmitter of the processing server configured to electronically transmit the generated one-time value in response to the received first transaction request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Processing of One-Time Number Transactions with Mapped Transaction Accounts

Figure 1:
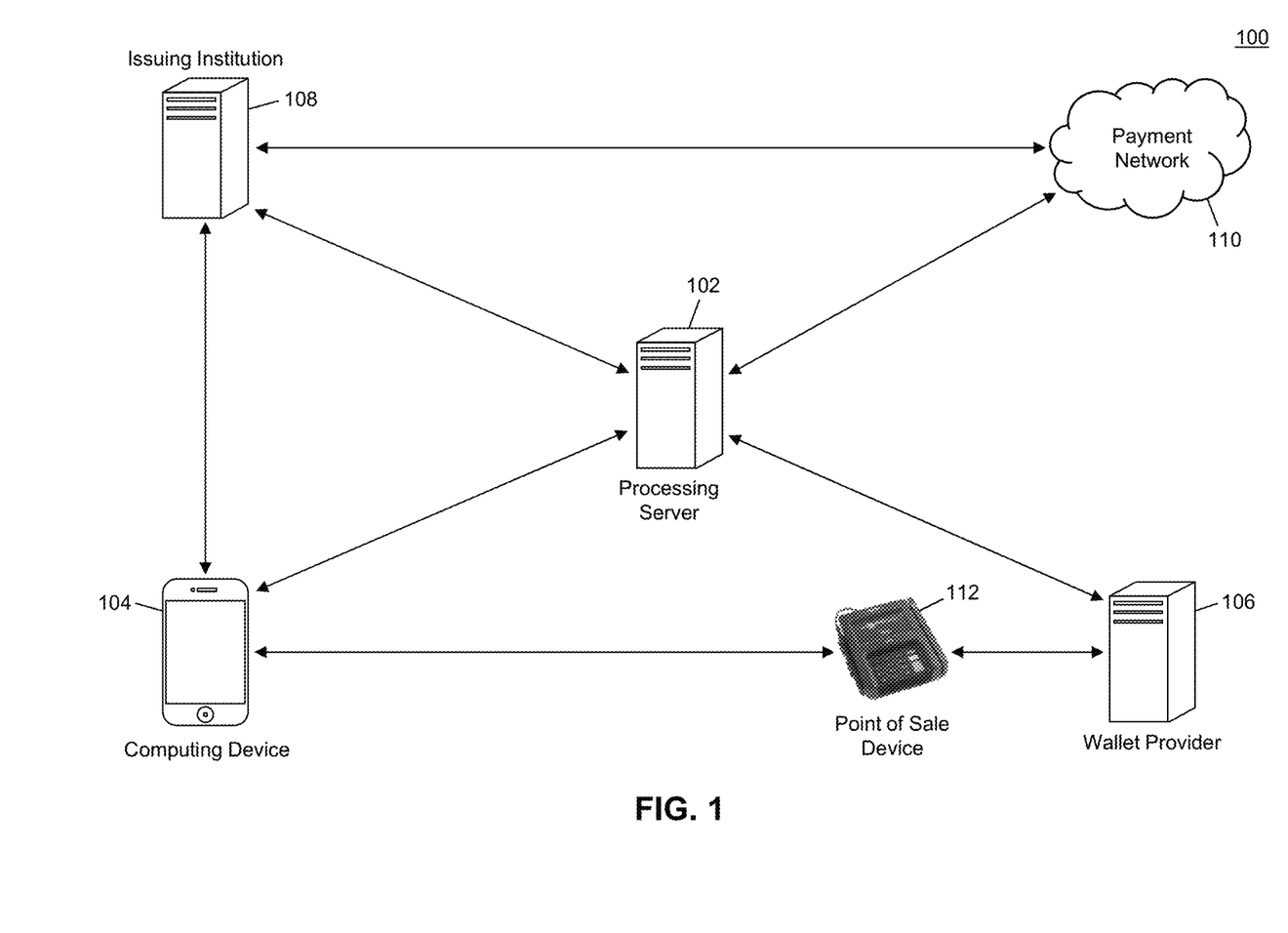
FIG. 1 is a block diagram illustrating a high level system architecture for facilitating payment transactions involving one-time numbers in accordance with exemplary embodiments.

FIG. 1 illustrates a system 100 for the processing of payment transactions that utilize one-time numbers that are funded by standard transaction accounts mapped thereto via the use of a back-end processing system.

The system 100 may include a processing server 102. The processing server 102, discussed in more detail below, may be configured to perform mapping of transaction account credentials to one-time numbers for use thereof in funding transactions conducted with one-time numbers with the mapped transaction accounts. As used herein, "one-time number" may refer to a number or any other type of data that may be used for a single transaction that includes data suitable for use in performing the functions discussed herein. For instance, an alphanumeric value or other type of data may be used as an alternative to the one-time number. As discussed herein, a one-time number may be encoded in a machine-readable code that is displayed for use in conveyance thereof. The machine-readable code may be any type of code suitable for encoding the one-time number, such as a bar code or a quick response (QR) code. The one-time number may include at least an identification value, where any other data included in the one-time number may be referred to herein as "remaining value." In one embodiment, the one-time number may be an 18 digit number, where the first two digits may be the identification value, and where the other 16 digits may be the remaining value.

In the system 100, a consumer may be interested in conducting a payment transaction with a one-time number that is funded via a transaction account not issued or managed by a wallet provider 106 that is configured to process one-time number transactions as a payment service provider. The consumer may possess a computing device 104, which may be used to obtain a one-time number that is mapped to the desired transaction account, to enable the transaction account to be used to fund a payment transaction that is processed via the one-time number. The computing device 104 may be any type of device suitable for performing the functions discussed herein, such as a laptop computer, notebook computer, tablet computer, cellular phone, smart phone, smart watch, wearable computing device, implantable computing device, etc.

The system 100 may include an issuing institution 108. The issuing institution 108 may be a financial institution, such as an issuing bank, or other entity configured to issue transaction accounts for use in funding electronic payment transactions. The issuing institution 108 may issue a transaction account to the consumer that may be used in electronic payment transactions. As part of the issuing of the transaction account, the issuing institution 108 may provision payment credentials associated with the transaction account to the computing device 104 using a suitable method. The payment credentials may include a transaction account number or a tokenized version of a transaction account number and any other data necessary for the funding of an electronic payment transaction by the corresponding transaction account, such as may include a name, expiration date, security code, transaction counter, payment cryptogram, etc. The payment credentials may be stored in the computing device 104 using any suitable method, such as in a secure element or other secured data storage. In some cases, the computing device 104 may include an electronic wallet application program associated with the issuing institution 108 for the receipt and storage of the payment credentials.

Prior to the conducting of the one-time number transaction, the consumer may use the computing device 104 to request a one-time number from the processing server 102. The computing device 104 may electronically transmit a transaction request to the processing server 102 using a suitable communication network and method. In some cases, the transaction request may be submitted through an electronic wallet application program or an application programming interface (API) associated with the processing server 102. In an exemplary embodiment, the transaction request may be an authorization request or other transaction message for an electronic payment transaction. In such an embodiment, the computing device 104 may initiate a payment transaction with the processing server 102, where the payment transaction may be funded by the transaction account issued by the issuing institution 108 and include the payment credentials associated therewith, but where the transaction amount may be zero or a nominal value. In some such embodiments, the transaction request may be a transaction message formatted according to one or more standards governing the interchange of financial transaction messages, such as the International Organization of Standardization's ISO 8583 or ISO 20022 standards. In such cases, the transaction message may include a message type indicator indicative of an authorization request and may include a plurality of data elements including data elements configured to store the zero or nominal value transaction amount, the primary account number for the transaction account, and any other payment credentials that may be necessary.

The processing server 102 may receive the transaction request. The processing server 102 may identify that the transaction request corresponds to a request for one or more one-time numbers based on at least the zero or nominal value transaction amount. In some cases, the transaction message may include additional data values in one or more data elements that may indicate that the transaction corresponds to a request for a one-time number. The processing server 102 may parse the primary account number and any other payment credentials from the transaction message. The processing server 102 may then generate or otherwise identify one or more one-time numbers. The one-time number(s) may include at least an identification value that corresponds to or may otherwise identify or reference the processing server 102. In some cases, the identification value, or a separate portion of the one-time number, may reference the wallet provider 106. In some embodiments, the processing server 102 may generate the one-time number using internal processing systems. In other embodiments, the processing server 102 may be configured to obtain the one-time number from the wallet provider 106. In some cases, the processing server 102 may request the one-time number after receipt of the transaction request from the computing device 104. In other cases, the wallet provider 104 may provide the processing server 102 with one-time numbers periodically, which the processing server 102 may use as transaction requests are received.

Following identification of the one-time number, the processing server 102 may map the one-time number to the primary account number and any other payment credentials received in the transaction request. The mapping may include the storage of a data pair in internal or external memory of the processing server 102, wherein the data pair consists of the one-time number and the payment credentials for the transaction account. The processing server 102 may then provide the one-time number to the computing device 104. In some embodiments, the processing server 102 may perform standard processing of the attempted electronic payment transaction for the zero or nominal amount, where the transaction may be approved or denied (e.g., by the issuing institution 108 or processing server 102 on behalf thereof) and an authorization response returned to the computing device 104. For example, the transaction may be approved if for a zero transaction amount or may be declined if for a nominal transaction amount to prevent any payments made by the consumer in obtaining the one-time value. In some such embodiments, the authorization response may include the one-time number in a data element thereof. In other embodiments, the one-time number may be electronically transmitted to the computing device 104 separately from an authorization response. In such embodiments, the processing server 102 may receive communication data for use in identifying and communicating with the computing device 104 via the transaction request or other suitable method. For instance, the computing device 104 may be registered with the processing server 102 as associated with the transaction account, such as through the application program or API. In some embodiments, the one-time number may be encrypted or otherwise protected in transmission from the processing server 102 to the computing device 104.

The computing device 104 may thus receive the one-time number from the processing server 102. The computing device 104 may then use the one-time number in an electronic payment transaction to be conducted through, with, or otherwise involving the wallet provider 106 as a payment service provider for the transaction. For example, the computing device 104 may be configured to generate a machine-readable code that is encoded with the one-time number, which may be displayed on a display device interfaced therewith that is read by a merchant point of sale device 112. The point of sale device 112 may decode the one-time number therefrom and submit it to the wallet provider 106. In some cases, the one-time number may include a second identification value that is associated with the wallet provider 106 for use by the point of sale device 112 in routing the one-time number thereto. The merchant point of sale device 112 may also submit transaction data for the attempted electronic payment transaction to the wallet provider 106, which may include, for instance, a transaction amount or any other data that may be necessary or desired for the payment transaction, such as a transaction time, transaction date, merchant identification number, merchant category code, product data, offer data, reward data, loyalty data, point of sale data, currency type, etc. In some embodiments, the wallet provider 106 may be the point of sale device 112 and may receive the one-time number directly from the computing device 104 as part of the attempted electronic payment transaction.

The wallet provider 106 may thus obtain the one-time number as well as any transaction data for the payment transaction. The wallet provider 106 may identify the identification value included in the one-time number as being a reference to or otherwise associated with the processing server 102. The wallet provider 106 may then submit a transaction request to the processing server 102 for the one-time number transaction, where the transaction request includes at least the one-time number, transaction amount, and any other transaction data. In some embodiments, the wallet provider 106 may forward a transaction request received from a point of sale device 112 directly to the processing server 102 upon identification of the identification value included in the one-time number. In some cases, the transaction request submitted to the processing server 102 may be an authorization request for an electronic payment transaction, where the one-time number is stored in a data element configured for the storage of a primary account number according to the applicable standard(s).

The processing server 102 may thus receive the one-time number, transaction amount, and any other transaction data related to the electronic payment transaction initiated with the one-time number. The processing server 102 may then identify the payment credentials (e.g., at least the primary account number and any other data, as applicable) that are mapped to the one-time number. The processing server 102 may replace the one-time number in the authorization request with the primary account number and may otherwise update the data elements in the authorization request with the mapped payment credentials. In some embodiments, the processing server 102 may generate a new authorization request that includes the payment credentials. For instance, the wallet provider 106 may submit a transaction request to the processing server 102 that may utilize different standards than in electronic payment transactions funded via traditional transaction accounts. In such an instance, the processing server 102 may generate an authorization request that is formatted according to standards associated with traditional transaction accounts. The authorization request may include the payment credentials and any additional transaction data included in the received transaction request that may be used in traditional electronic payment transaction processing. In some embodiments, the processing server 102 may be configured to perform risk assessments prior to the generation or submission of the authorization request. For instance, the processing server 102 may check any restrictions or limitations placed on the one-time number, as discussed below, may perform fraud scoring or other analysis of the proposed transaction, may perform a timestamp check, or other assessment to determine if the transaction should proceed.

Once the processing server 102 has generated or otherwise obtained the authorization request including the payment credentials, the authorization request may be submitted to a payment network 110 for processing via payment rails associated therewith. The payment network 110 may then process the payment transaction using traditional methods and systems, which may include submitting the authorization request to the issuing institution 108 for approval or denial of the payment transaction and receipt of an authorization response therefrom. As part of the processing, the payment network 110 may return an authorization response to the processing server 102, where the authorization response may be formatted according to the applicable standard(s) and may include a data element configured to store a response code indicating approval or denial of the payment transaction. In some embodiments, the processing server 102 may be configured to receive the one-time number from the payment network 110 via payment rails associated therewith, such as through submission of the one-time number to the point of sale device 112. Additional detail regarding the use of payment rails for the conveyance of one-time numbers can be found in U.S. patent application Ser. No. 15/793,237, entitled "Method and System for Conveyance of Machine Readable Code Data via Payment Network," filed on Oct. 25, 2017, which is herein incorporated by reference in its entirety.

Once an authorization response is received from the payment network 110, the processing server 102 may return a response to the transaction request to the wallet provider 106. In some cases, the processing server 102 may forward the authorization response to the wallet provider 106, but may first replace the primary account number and any other payment credentials with the mapped one-time number. In other cases, the processing server 102 may provide a response to the transaction request that is formatted according to standards applicable to the transaction request, which may be separate from standards applicable to the authorization response. The wallet provider 106 may receive the transaction response from the processing server 102 and then finalize the one-time number transaction accordingly (e.g., based on the approval or denial of the payment transaction by the issuing institution 108). As a result, the one-time number transaction may be funded (e.g., if approved) by the standard transaction account via the use of the processing server 102 and mapping of the payment credentials for the transaction account to a one-time number.

In some embodiments, restrictions may be placed on the one-time number issued to the computing device 104 by the processing server 102. For instance, in some cases, the one-time number may be limited in the time during which it may be used. In one example, the one-time number may have a predetermined period of time during which it must be used in a transaction through the wallet provider 106 or else any transaction attempted using the one-time number may be declined. Such a time out mechanism may prevent unauthorized using of the payment credentials, such as in cases where the computing device 104 may be stolen. In some instances, the one-time number itself may include data indicating such restrictions, such as an expiration time and/or date being included in the one-time number. In other instances, the processing server 102 may store such information (e.g., in the data pair used for mapping) and may utilize such information when performing the mapping upon receipt of the transaction request. In some embodiments, the processing server 102 may issue multiple one-time numbers to the computing device 104 for use in a series of transactions. In some such embodiments, one or more of the one-time numbers may be available for use by the computing device 104 offline (e.g., without an active Internet or other communication channel capable of communicating with the processing server 102). In such an embodiment, the one-time numbers available for offline use may have restrictions placed thereon, such as an expiration time and/or date, which may be updated if the computing device 104 goes back online (e.g., the expiration date may be extended by the processing server 102 once in communication with the computing device 104).

In some cases, the processing server 102 may perform authentication of the consumer prior to issuing of the one-time number. For instance, the processing server 102 may require the consumer to provide authentication information (e.g., username, password, personal identification number, etc.), which must be authenticated prior to the issuance of the one-time number. In some embodiments, the processing server 102 may alternatively or additionally authenticate the computing device 104 itself, such as to ensure that the computing device 104 has not been compromised. For example, the processing server 102 and computing device 104 may perform a mutual authentication prior to issuance of the one-time number. In some instances, one or more functions of the processing server 102 may be performed by the computing device 104, such as in cases where a communication channel between the processing server 102 and computing device 104 may be unavailable. For instance, the processing server 102 may provide the computing device 104 with one-time numbers for use that are mapped to the transaction account ahead of time, which may be securely stored in the computing device 104 and unavailable for use until such a time as requested by the consumer, which may require additional authentication to be performed.

In some cases, the one-time number may be associated with additional data in addition to a transaction account. For instance, in one embodiment, a one-time number may be associated with a coupon or other deal, discount, or redeemable object. In such embodiments, the processing server 102 may receive the one-time number and identify the corresponding redeemable object. The processing server 102 may then perform any actions associated with the redemption of the redeemable object (e.g., discounting of the transaction if the redeemable object is a coupon) and then process the transaction as discussed above. In some instances, the one-time number associated with the redeemable object may be mapped to a second one-time number (e.g., associated with the transaction account, as discussed above), which may then be mapped to the transaction account, as discussed above. In some cases, one-time numbers associated with redeemable objects may be formatted differently or otherwise indicate their association with a redeemable object as opposed to a transaction account. For example, one-time numbers for redeemable objects may have a different number of digits or have a unique identifier in a different range from unique identifiers for transaction account one-time numbers.

In some embodiments, the computing device 104 may be provided with an electronic receipt for the payment transaction. The electronic receipt may be provided by the wallet provider 106 (e.g., through the point of sale device 112), the processing server 102, or a third party entity configured to provide receipts for processed transactions. The electronic receipt may include transaction data for the payment transaction including a unique identifier associated with the transaction, such as an identification number or other suitable value. In some cases, the unique identifier may be the one-time number. In some instances, the computing device 104 may be configured to present the electronic receipt for refunding of the processed transaction. For instance, the computing device 104 may electronically transmit the unique identifier to the wallet provider 106 (e.g., via the point of sale device 112), which may use the unique identifier to identify the previously processed transaction. The wallet provider 106 may then forward the one-time number or other data for the transaction to the processing server 102 in a request for a refund. The processing server 102 may then identify the transaction account used to fund the transaction and refund the processed transaction using traditional methods and systems. In some cases, the computing device 104 may submit the request for a refund directly to the processing server 102.

The methods and systems discussed herein thus enable wallet providers 106 and merchants that are configured to utilize one-time numbers to continue to do so while enabling consumers to fund such transactions with traditional transaction accounts. The result is that merchants and wallet providers 106 can expand their customer base and increase their transaction capabilities, while at the same time providing consumers with greater convenience in providing them to freely select transaction accounts for use in funding payment transactions for both standard and one-time number transactions. The processing server 102 therefore provides a technological improvement to transaction processing systems by enabling traditional transaction accounts to be used to fund payment transactions initiated via one-time numbers through the use of an initial zero or nominal payment transaction that facilitates mapping of payment credentials with a one-time number that can be utilized when a transaction is attempted using that one-time number. This also, as a result, facilitates the use of a traditional transaction account to fund payment transactions conducted using a one-time number, which may be performed without transmissions utilizing payment rails or other payment network infrastructure.

Processing Server

Figure 2:
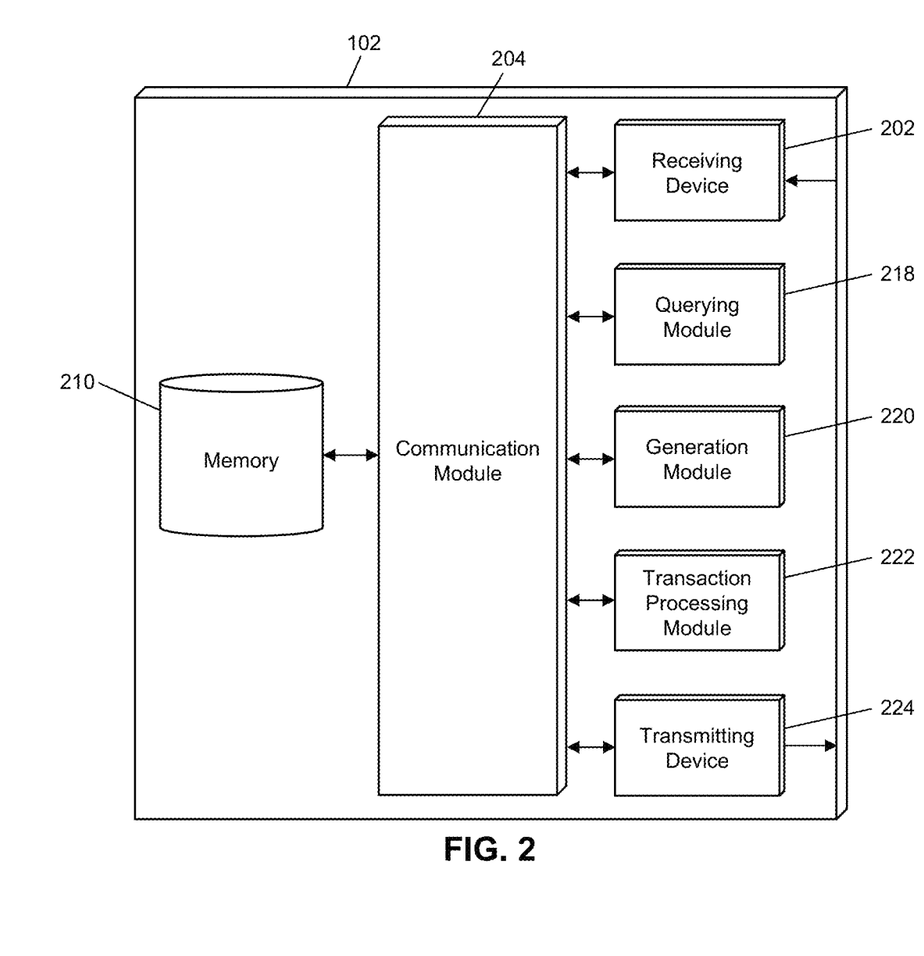
FIG. 2 is a block diagram illustrating the processing server of the system of FIG. 1 for facilitating payment transactions involving one-time numbers in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 104, wallet providers 106, issuing institutions 108, payment networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104, which may be superimposed or otherwise encoded with transaction requests, which may be formatted according to standards governing the interchange of financial transaction messages. The transaction requests may include payment credentials and a zero or nominal transaction amount. The receiving device 202 may also be configured to receive data signals electronically transmitted by wallet providers 106, which may be superimposed or otherwise encoded with one-time numbers or identification or remaining values to be included therein, or may be superimposed or otherwise encoded with transaction requests for one-time number transactions, which may include one-time numbers, transaction amounts, and any other suitable transaction data. The receiving device 202 may be configured to receive data signals electronically transmitted by issuing institutions 108, which may be superimposed or otherwise encoded with payment credentials for mapping, authorization responses for attempted electronic payment transactions, or other data as discussed herein. The receiving device 202 may be further configured to receive data signals electronically transmitted by payment networks 110, which may be superimposed or otherwise encoded with authorization responses for electronic payment transactions, which may be transmitted via payment rails associated with the payment network 110.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store, for example, data pairs used for mapping, which may include at least a primary account number (e.g., and additional payment credentials, as applicable) and a one-time number mapped thereto. In some cases, a data pair may further include an expiration time and/or date or any other restrictions that may be placed thereon. In some cases, the memory 210 may store profiles associated with transaction accounts, where a profile may include multiple data pairs (e.g., for multiple one-time numbers issued on the same transaction account) and any other data for use in performing the functions discussed herein, such as authentication data, usage restrictions, communication data associated with a corresponding computing device 104, etc.

The processing server 102 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the processing server 102 as necessary. The querying module 218 may, for example, execute a query on the memory 210 to insert a new data pair therein upon receipt of a transaction request from a computing device 104 for a new mapping between a primary account number and one-time number. The querying module 218 may also be configured to execute queries on the memory 210 to identify previously stored data pairs for use in mapping a one-time number included in a received transaction request to the corresponding payment credentials.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate one-time numbers, where each one-time number may include an identification value associated with or otherwise referencing the processing server 102 for use in routing by the wallet provider 106 or other entity. The generation module 220 may also be configured to generate transaction messages for use in the processing of electronic payment transactions as discussed herein.

The processing server 102 may also include a transaction processing module 222. The transaction processing module 222 may be configured to perform functions associated with the processing of transactions as part of the processing server 102 as discussed herein. For example, the transaction processing module 222 may be configured to initiate payment transactions for the funding of one-time number transactions using traditional transaction accounts, perform routing of authorization requests and responses, etc.

The processing server 102 may also include a transmitting device 224. The transmitting device 224 may be configured to transmit data over one or more networks via one or more network protocols. In some instances, the transmitting device 224 may be configured to transmit data to computing devices 104, wallet providers 106, issuing institutions 108, payment networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to computing devices 104 that may be superimposed or otherwise encoded with responses to transaction requests, which may include or be accompanied by one-time numbers, which may be encrypted or otherwise protected in transmission thereto. The transmitting device 224 may also be configured to electronically transmit data signals to wallet providers 106, which may be superimposed or otherwise encoded with transaction responses, which may be authorization responses formatted according to standards governing the interchange of financial transaction messages, or may be superimposed or otherwise encoded with requests for one-time numbers. The transmitting device 224 may be further configured to electronically transmit data signals to issuing institutions 108, which may be superimposed or otherwise encoded with transaction messages, requests for payment credentials, authentication requests, or other data as discussed herein. The transmitting device 224 may also be configured to electronically transmit data signals to payment networks 110, which may be superimposed or otherwise encoded with authorization requests, which may be submitted via payment rails associated with the payment network 110.

Process for Provisioning of a One-Time Number to a Computing Device

Figure 3:
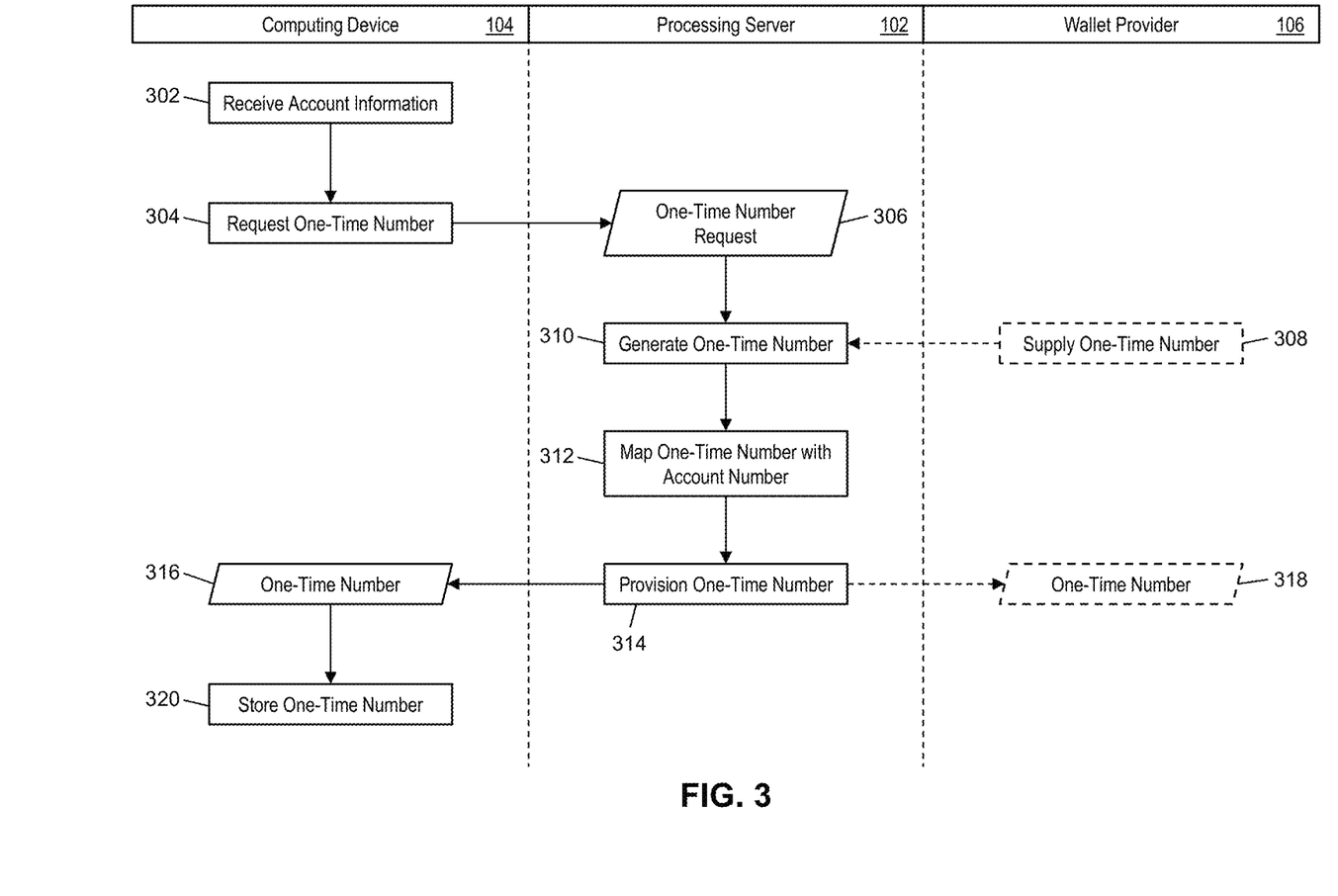
FIG. 3 is a flow diagram illustrating a process for the provisioning of a one-time number mapped with a transaction account to a computing device using the system of FIG. 1 in accordance with exemplary embodiments.

FIG. 3 illustrates an example process executed in the system 100 of FIG. 1 for the provisioning of a one-time number from the processing server 102 to the computing device 104 that is mapped with payment credentials associated with a transaction account.

In step 302, the computing device 102 may receive account information from the issuing institution 108, which may include payment credentials associated with a transaction account that are suitable for use in funding an electronic payment transaction with the associated transaction account. In step 304, the computing device 104 may submit a request for a one-time number to the processing server 102 using a suitable communication network and method. For instance, the request may be submitted via a web page, application program executed by the computing device 104, short messaging service message, e-mail, API of the processing server 102, etc. In an exemplary embodiment, the one-time number request may be submitted as a payment transaction having a zero or nominal transaction amount, where the payment credentials are supplied as the funding source for the payment transaction. In step 306, the receiving device 202 of the processing server 102 may receive the request. The one-time number request may include at least the payment credentials associated with the transaction account for which the one-time number is requested. In some cases, the request may also include a period of time during which the one-time number is to be used, which may be used to set the expiration period for the one-time number.

In some embodiments, the process may include step 308, where the wallet provider 106 may supply one or more one-time numbers to the processing server 102 using a suitable communication network and method for receipt by the receiving device 202 thereof. Step 308 may be an optional step and may not be performed in cases where the processing server 102 is configured to generate one-time numbers without being supplied directly by the wallet provider 106. In step 310, the generation module 220 of the processing server 102 may generate or otherwise identify (e.g., if supplied by the wallet provider 106) a one-time number. The one-time number may include at least an identification value that references the processing server 102. In some cases, the one-time number may further include a second identification value or the identification value may additional include data referencing the wallet provider 106.

In step 312, the querying module 218 of the processing server 102 may execute a query on the memory 210 of the processing server 102 to store a data pair therein mapping the generated one-time number with the payment credentials received in the one-time number request. In cases where one or more restrictions may be placed on use of the one-time number, the data pair may further include the restrictions. In step 314, the transmitting device 224 of the processing server 102 may electronically transmit the one-time number to the computing device 104 using a suitable communication network and method. In cases where the one-time number may be subject to restrictions, such data may be provided with the one-time number. In an exemplary embodiment, the one-time number may be included in or may accompany an authorization response or other response to an attempted payment transaction initiated by the computing device 104 (e.g., as part of step 304). In step 316, the computing device 104 may receive the one-time number. In some embodiments, the process may include step 318, where the wallet provider 106 may also be provided a copy of the one-time number. In step 320, the computing device 104 may store the one-time number therein for later use in an electronic payment transaction.

Process for Funding a One-Time Number Transaction with a Transaction Account

Figure 4:
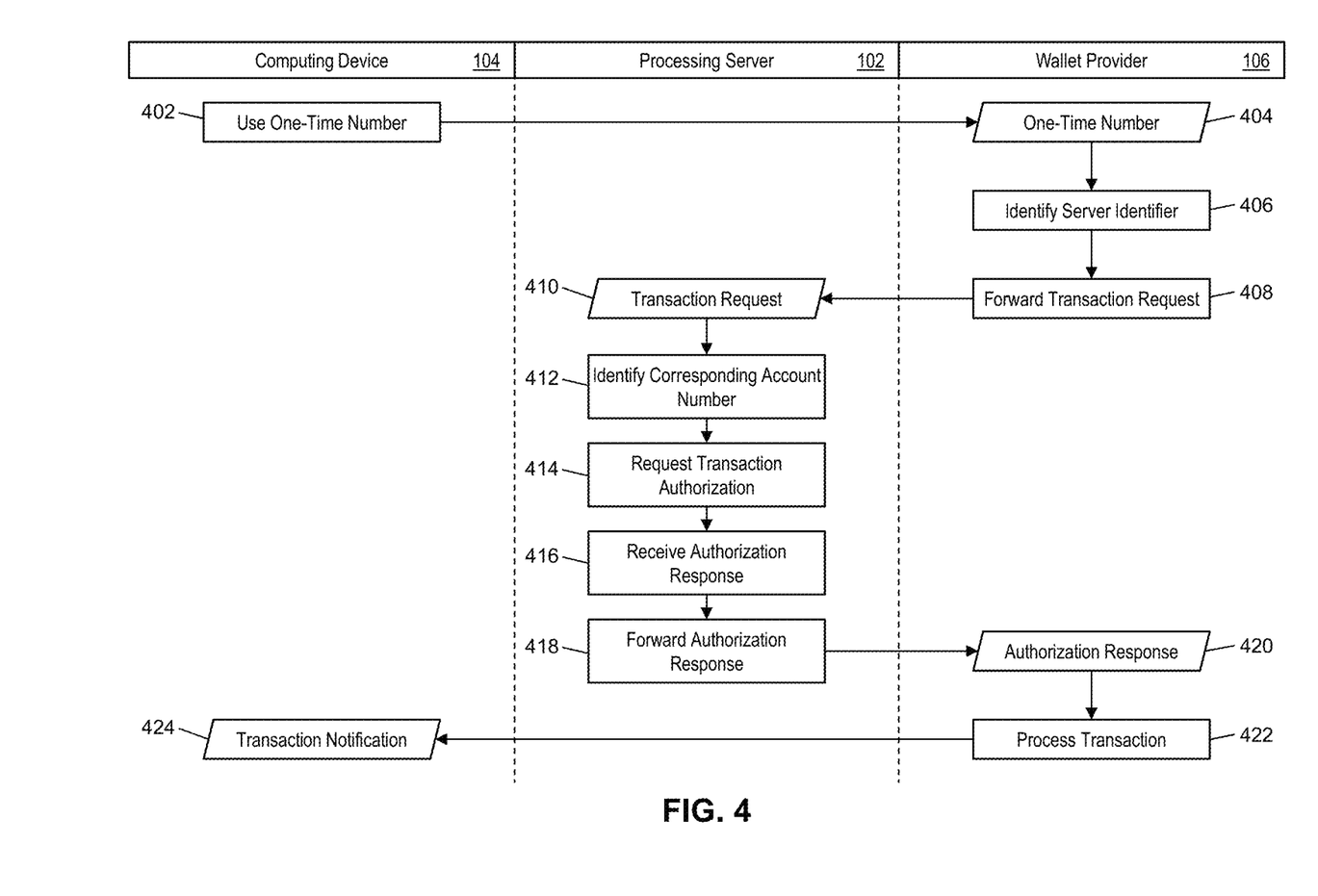
FIG. 4 is a flow diagram illustrating a process for the use of a one-time number mapped with a transaction account in a payment transaction using the system of FIG. 1 in accordance with exemplary embodiments.

FIG. 4 illustrates an example process executed in the system 100 of FIG. 1 for the processing of a one-time number payment transaction that is funded using a standard transaction account with traditional processing thereof.

In step 402, the computing device 104 may submit a one-time number (e.g., provisioned thereto using the process illustrated in FIG. 3 and discussed above) to a wallet provider 106 for use in an electronic payment transaction utilizing the one-time number. The one-time number may be submitted to the wallet provider 106 (e.g., directly or via an intermediate system or entity, such as the point of sale device 112) using any suitable method, such as near field communication, radio frequency, Bluetooth, short messaging service, e-mail, display in a machine-readable code read by the wallet provider 106, etc. In some cases, the one-time number may be included in a transaction message or other data message submitted to the wallet provider 106 as part of a payment transaction, such as may include a transaction amount and other suitable data. In step 404, the wallet provider 106 may receive the one-time number. The one-time number may include at least an identification value that references the processing server 102. In step 406, the wallet provider 106 may parse the identification value form the one-time number that references the processing server 102.

In step 408, the wallet provider 106 may forward a transaction request for the electronic payment transaction to the processing server 102. In some cases, the transaction request may be submitted by the computing device 104 (e.g., in step 402) and forwarded directly to the processing server 102. In other cases, the wallet provider 106 may generate the transaction request to include transaction data for the electronic payment transaction and the one-time number received from the computing device 104. In step 410, the receiving device 202 of the processing server 102 may receive the transaction request. The transaction request may include at least the one-time number, transaction amount, and any other data suitable for use in the processing of an electronic payment transaction.

In step 412, the querying module 218 of the processing server 102 may execute a query on the memory 210 of the processing server 102 to identify payment credentials that are mapped to the one-time number. In step 414, the generation module 220 of the processing server 102 may generate an authorization request for a payment transaction that includes the identified payment credentials and the transaction amount and any other data from the request received from the wallet provider 106, which may be transmitted, by the transmitting device 224 of the processing server 102, to the payment network 110 via payment rails associated therewith for processing. In step 416, the receiving device 202 of the processing server 102 may receive an authorization response from the payment network 110 via payment rails associated therewith for the payment transaction, which may include a data element configured to store a response code indicating approval or denial of the payment transaction.

In step 418, the transmitting device 224 of the processing server 102 may forward an authorization response to the wallet provider 106. In some cases, the authorization response may be the same authorization response received from the payment network 110. In some such cases, the payment credentials may be replaced with the one-time number prior to forwarding. In other cases, the generation module 220 of the processing server 102 may generate a separate response to the transaction request submitted by the wallet provider 104, which may be utilized as the authorization response forwarded to the wallet provider 104. In step 420, the wallet provider 106 may receive the authorization response from the processing server 102. In step 422, the wallet provider 106 may perform any additional processing for the transaction based on the received authorization response, such as by furnishing the consumer associated with the computing device 104 with transacted-for goods or services. In step 424, the computing device 104 may receive a notification indicating if the transaction was approved or denied or any other data associated with the processing of the one-time number transaction.

Exemplary Method for Facilitating a Transaction with a One-Time Number

Figure 5:
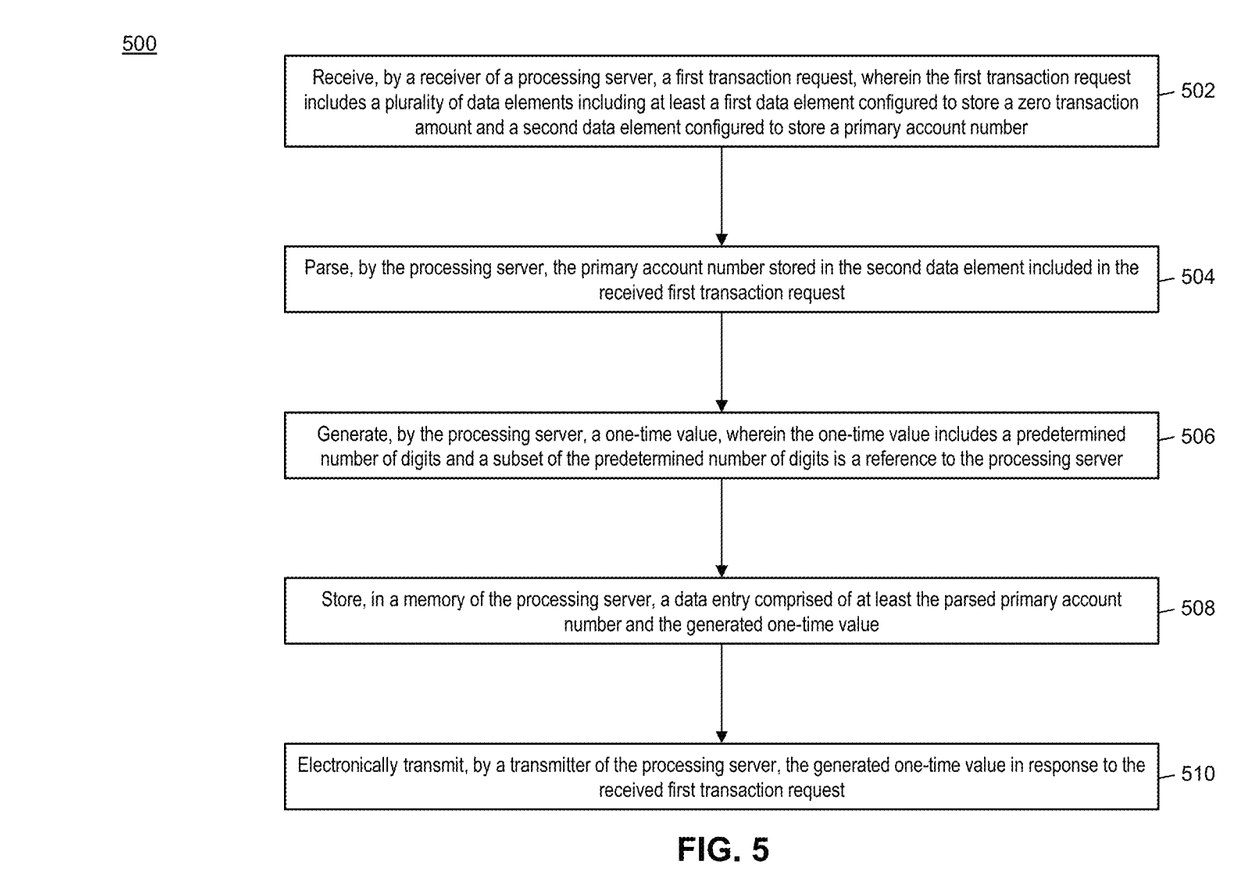
FIG. 5 is a flow chart illustrating an exemplary method for facilitating a transaction with a one-time number in accordance with exemplary embodiments.

FIG. 5 illustrates a method 500 for the processing of a transaction that utilizes a one-time number via mapping of the one-time number to payment credentials of a transaction account.

In step 502, a first transaction request may be received by a receiver (e.g., the receiving device 202) of a processing server (e.g., the processing server), wherein the first transaction request includes a plurality of data elements including at least a first data element configured to store a zero transaction amount and a second data element configured to store a primary account number. In step 504, the primary account number stored in the second data element included in the received first transaction request may be parsed by the processing server (e.g., via the receiving device 202 or other module or engine of the processing server).

In step 506, a one-time value may be generated by the processing server (e.g., via the generation module 220 thereof), wherein the one-time value includes a predetermined number of digits and a subset of the predetermined number of digits is a reference to the processing server. In step 508, a data entry comprised of at least the parsed primary account number and the generated one-time value may be stored in a memory (e.g., the memory 210) of the processing server (e.g., via the querying module 218 thereof). In step 510, the generated one-time value may be electronically transmitted by a transmitter (e.g., the transmitting device 224) of the processing server in response to the received first transaction request.

In one embodiment, the method 500 may further include: receiving, by the receiver of the processing server, a second transaction request, wherein the second transaction request includes a plurality of data elements including at least a first data element configured to store a non-zero transaction amount and a second data element storing the one-time value; replacing, by the processing server, the one-time value stored in the second data element included in the received second transaction request with the primary account number; electronically transmitting, by the transmitter of the processing server, the second transaction request to an issuing financial institution (e.g., the issuing institution 108) based on the primary account number after replacing of the one-time value; receiving, by the receiver of the processing server, a transaction response from the issuing financial institution; and forwarding, by the transmitter of the processing server, the transaction response in response to the second transaction request. In a further embodiment, the second transaction request may be received from a third party entity (e.g., the wallet provider 106). In another further embodiment, the first transaction request may be received from a computing device (e.g., the computing device 104).

In some embodiments, the predetermine number of digits may be 18 or 19. In one embodiment, the subset of the predetermined number of digits may be 3 or 4. In some embodiments, a remainder of the predetermined number of digits not included in the subset may be a random or pseudo-random value. In one embodiment, the first transaction request may be formatted according to one or more standards governing the interchange of financial transaction messages.

Computer System Architecture

Figure 6:
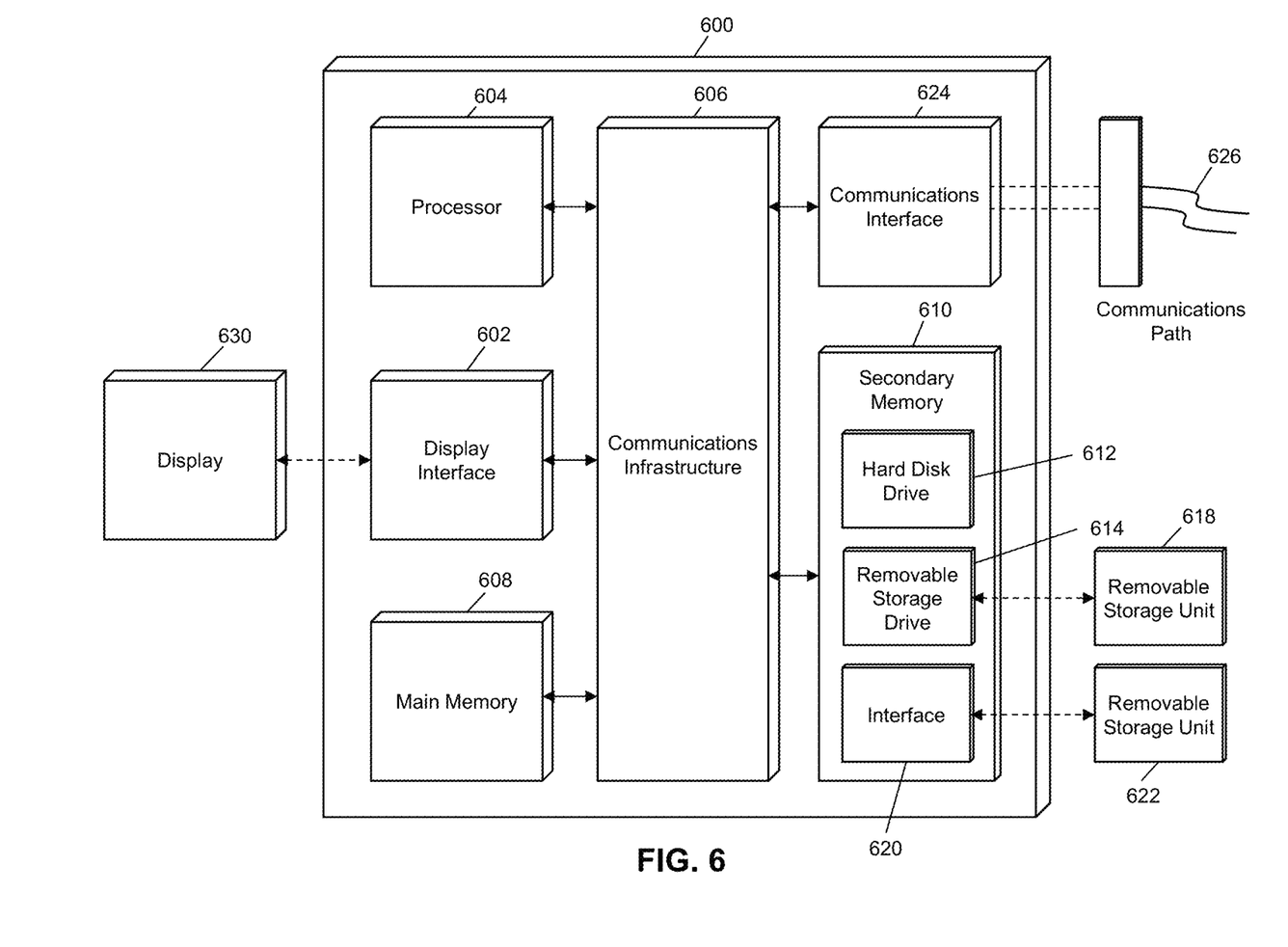
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for facilitating a transaction with a one-time number. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for facilitating a transaction with a one-time number, comprising:
   prior to a transaction occurring between a consumer and a merchant, receiving, by a receiver of a processing server, a first transaction request from a computing device of the consumer, wherein the first transaction request includes a zero transaction amount and a primary account number, and wherein the merchant and the processing server are separate and distinct entities;
   based on the zero transaction amount stored in the first data element, determining, by the processing server that the first transaction request, received from the computing device of the consumer, is a request for a one-time value;
   generating, by the processing server, the one-time value, wherein the one-time value includes a reference to the processing server;
   mapping, by the processing server, the primary account number included in the first transaction request and the generated one-time value in a memory;
   electronically transmitting, by a transmitter of the processing server, the generated one-time value to the computing device of the consumer;
   receiving, by the receiver of the processing server, a second transaction request including a non-zero transaction amount and the one-time value;
   replacing, by the processing server, the one-time value included in the received second transaction request with the primary account number mapped thereto in the memory;
   electronically transmitting, by the transmitter of the processing server, the second transaction request to an issuing financial institution after replacing of the one-time value;
   receiving, by the receiver of the processing server, a transaction response from the issuing financial institution; and
   forwarding, by the transmitter of the processing server, the transaction response in response to the second transaction request.

2. The method of claim 1, wherein the one-time value includes a predetermined number of digits, wherein the predetermined number of digits is 18 or 19.

3. The method of claim 1, wherein the one-time value includes a predetermined number of digits and a subset of the predetermined number of digits is the reference to the processing server, wherein the subset of the predetermined number of digits is 3 or 4.

4. The method of claim 1, wherein
   the first transaction request further includes authentication data, and
   the method further comprises:
   validating, by the processing server, the authentication data against a transaction account associated with the primary account number, where the one-time value is generated upon successful validation.

5. The method of claim 1, wherein the first transaction request is formatted according to one or more standards governing the interchange of financial transaction messages.

6. A system for facilitating a transaction with a one-time number, comprising:
   a receiver, of a processing server, configured to receive a first transaction request from a computing device of a consumer prior to a transaction occurring between the consumer and a merchant, wherein the first transaction request includes a zero transaction amount and a primary account number, and wherein the processing server and the merchant are separate and distinct entities;
   a processing device, of the processing server, configured to
      determine, based on the zero transaction amount stored in the first data element of the first transaction request received from the computing device of the consumer, that the first transaction request is a request for a one-time value;
      generate the one-time value, wherein the one-time value is a reference to the processing server, and
      map the primary account number included in the first transaction request and the generated one-time value;
   a memory, of the processing server, configured to store the primary account number and the generated one-time value mapped by the processing device; and
   a transmitter, of the processing server, configured to electronically transmit the generated one-time value, to the computing device of the consumer,
   wherein
   the receiver, of the processing server, is further configured to request a second transaction request including a non-zero transaction amount and the one-time value,
   the processing server is configured to replace the one-time value included in the received second transaction request with the primary account number mapped thereto in the memory,
   the transmitter, of the processing server, is further configured to electronically transmit the second transaction request to an issuing financial institution after replacing of the one-time value;
   the receiver, of the processing server, is further configured to receive a transaction response from the issuing financial institution; and
   the transmitter, of the processing server, is further configured to forward the transaction response in response to the second transaction request.

7. The system of claim 6, wherein the one-time value includes a predetermined number of digits, wherein the predetermined number of digits is 18 or 19.

8. The system of claim 6, wherein the one-time value includes a predetermined number of digits and a subset of the predetermined number of digits is the reference to the processing server, wherein the subset of the predetermined number of digits is 3 or 4.

9. The system of claim 6, wherein
the first transaction request further includes authentication data,
the processing server is further configured to validate the authentication data against a transaction account associated with the primary account number, and
the one-time value is generated upon successful validation of the authentication data.

10. The system of claim 6, wherein the first transaction request is formatted according to one or more standards governing the interchange of financial transaction messages.

\* \* \* \* \*